(12) United States Patent  
Jimenez

(10) Patent No.: US 7,811,038 B2
(45) Date of Patent: Oct. 12, 2010

(54) SELF-LOCKING NUT

(75) Inventor: Daniel Trejo Jimenez, Longview, TX (US)

(73) Assignee: Stemco LP, Longview, TX (US)

( * ) Notice: Subject to any disclaimer, the term of this patent is extended or adjusted under 35 U.S.C. 154(b) by 0 days.

(21) Appl. No.: 11/852,510

(22) Filed: Sep. 10, 2007

(65) Prior Publication Data

US 2008/0063489 A1    Mar. 13, 2008

Related U.S. Application Data

(60) Provisional application No. 60/843,229, filed on Sep. 8, 2006, provisional application No. 60/914,872, filed on Apr. 30, 2007.

(51) Int. Cl.
*F16B 39/32* (2006.01)
(52) U.S. Cl. .................. 411/328; 411/326; 411/204
(58) Field of Classification Search ............... 411/120, 411/326, 149, 161, 163, 327, 328, 329, 204
See application file for complete search history.

(56) References Cited

U.S. PATENT DOCUMENTS

| | | | | | |
|---|---|---|---|---|---|
| 454,364 | A | * | 6/1891 | Kroell | 411/328 |
| 763,950 | A | * | 7/1904 | Beckett | 411/328 |
| 1,140,974 | A | * | 5/1915 | Formby | 411/115 |
| 1,164,575 | A | * | 12/1915 | Chalker | 411/328 |
| 1,868,007 | A | * | 7/1932 | Frelin | 411/326 |
| 2,393,764 | A | * | 1/1946 | Frank | 74/424.95 |
| 4,812,094 | A | * | 3/1989 | Grube | 411/134 |
| 5,597,278 | A | * | 1/1997 | Peterkort | 411/134 |
| 6,010,289 | A | * | 1/2000 | DiStasio et al. | 411/174 |

* cited by examiner

*Primary Examiner*—Gary Estremsky
(74) *Attorney, Agent, or Firm*—Holland & Hart LLP

(57) ABSTRACT

A self-locking nut includes a nut; a washer having a locking feature, the locking feature having a plurality of ridges; and at least one locking tab for slidably coupling the nut to the washer and engaging with the locking feature to resist rotation of the nut with respect to the washer.

7 Claims, 17 Drawing Sheets

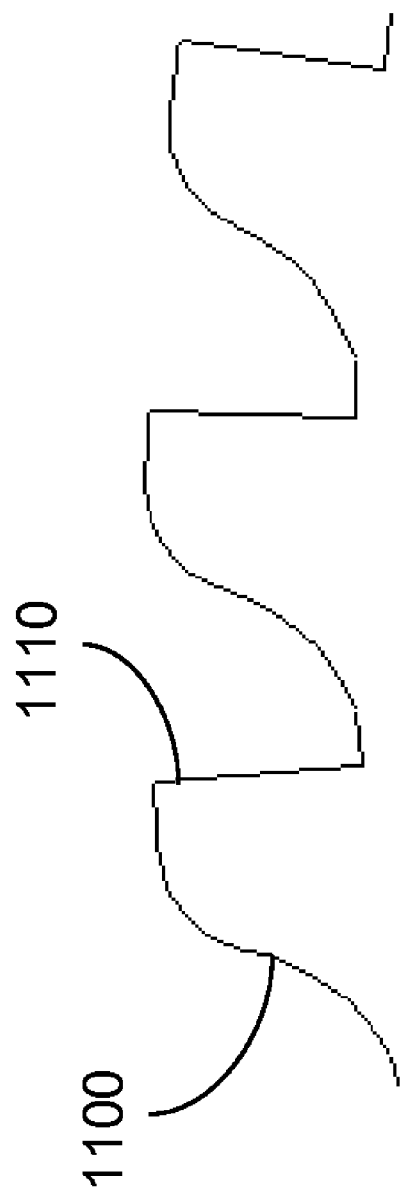

SELF-LOCKING NUT

CROSS-REFERENCES TO RELATED APPLICATION

This application claims priority to U.S. Provisional Patent Application No. 60/843,229 filed Sep. 8, 2006, entitled "Self-Locking Nut," and U.S. Provisional Patent Application No. 60/914,872 filed Apr. 30, 2007, entitled "Self-Locking Nut."

FIELD OF THE INVENTION

Embodiments of the present invention generally relate to fastening mechanisms. Embodiments of the present invention more specifically relate to self-locking fastening mechanisms.

BACKGROUND

In the art, nuts are implements attached to the ends of axles or spindles and may be used to hold an object in place. For example, a nut may be used to hold the wheel-end of a truck in place by engaging with a spindle. A nut is generally a metal part with a circular, threaded bore through the middle, usually for engaging with a threaded spindle or similar implement. The nut is screwed onto the spindle and tightened against the object to be held in place. However, a problem with conventional nuts is that they may be prone to loosening during use, a failure known as "backing off." For example, if a nut securing a truck's wheel-end backs off, the wheel-end may become loose or break apart from the vehicle, and may cause an accident.

To remedy this problem, there are self-locking nuts made with multiple components that are assembled as the nut is put into place that cause the nut to lock into place, reducing the likelihood of the nut backing off.

SUMMARY

Embodiments of the present invention provide self-locking nuts. For example, according to one embodiment of the present invention, a self-locking nut comprises a nut; a washer comprising a locking feature, the locking feature comprising a plurality of ridges; and at least one locking tab for slidably coupling the nut to the washer and engaging with the locking feature to resist rotation of the nut with respect to the washer.

This illustrative embodiment is mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIG. 11 shows a locking feature according to one embodiment of the present invention;

DETAILED DESCRIPTION

Embodiments of the present invention provide a variety of self-locking fasteners.

Figure 1:
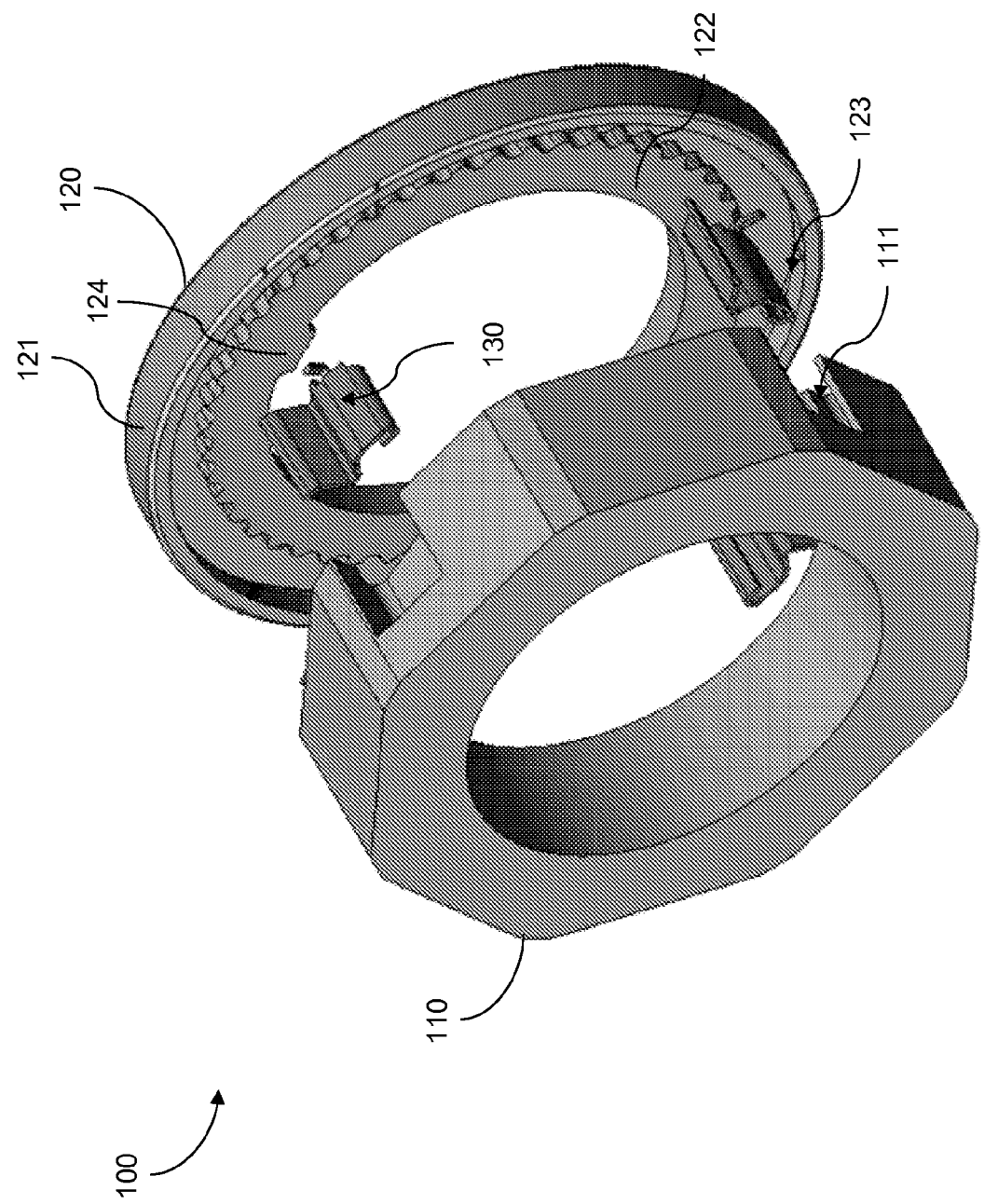
FIG. 1 shows an exploded view of a self-locking nut according to one embodiment of the present invention.

Referring to the drawings in which like numerals refer to like elements throughout the several Figures, FIG. 1 shows an exploded view of a self-locking nut 100 according to one embodiment of the present invention. In the embodiment shown in FIG. 1, self-locking nut 100 comprises a nut 110, a washer 120, and four locking tabs 130, three of which are visible. Nut 110 comprises a generally octagonal outer perimeter and defines a substantially cylindrical opening through the center of the nut 1 10. While the nut 110 shown in FIG. 1 has a substantially octagonal outer perimeter, nuts according to other embodiments of the present invention may have other suitable shapes. For example, in one embodiment, nut 110 may comprise a substantially hexagonal outer perimeter. In other embodiments, nut 110 may comprise other outer perimeter shapes, including without limitation circular, square, pentagonal, or any other suitable shape.

In the embodiment shown in FIG. 1, nut 110 comprises four cavities 111 configured to receive one locking tab 130 each. In a nut 110 having a substantially octagonal shape, four cavities may be beneficial as it may provide a generally symmetric and evenly-spaced arrangement of cavities 111 around the perimeter of the nut 110. However, other configurations are contemplated and within the scope of the present invention. For example, if symmetry and even spacing are desirable, two, four, or eight cavities 111 may be employed. Additionally, the shape of the nut 110 may affect the number and arrangement of cavities in a symmetrical or otherwise evenly-spaced configuration. Alternate embodiments not having evenly-spaced or symmetrically-arranged cavities may comprise other numbers of tabs. For example, in one embodiment according to the present invention, a nut 110 comprises three cavities or five cavities.

Each of the cavities 111 is configured to receive and engage with a locking tab 130 in the embodiment shown in FIG. 1.

Figure 2:
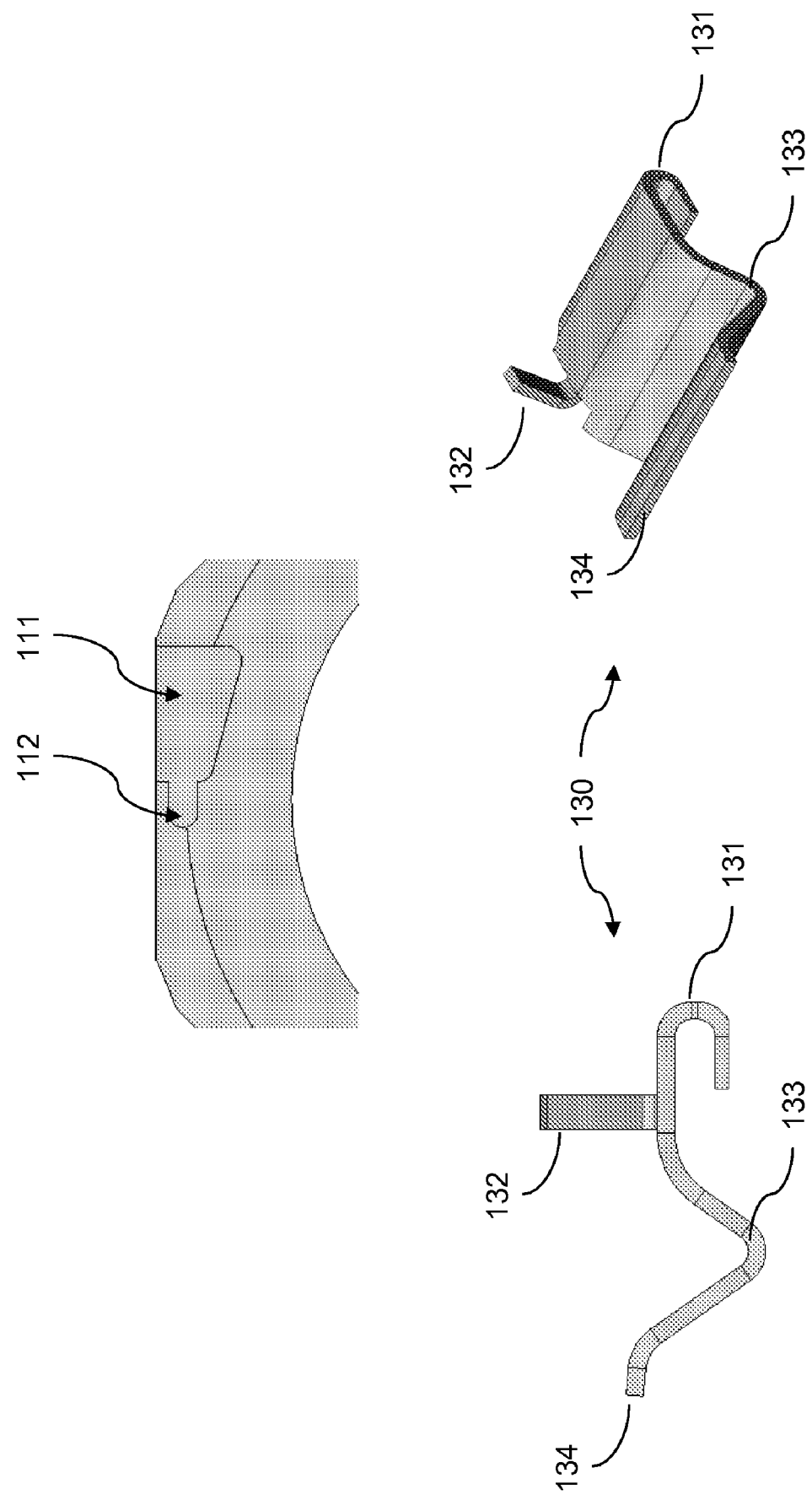
FIG. 2 shows views of a locking tab and cavity according to one embodiment of the present invention.

The cavities 111 have a shape complementary to the shape of at least a portion of the locking tabs as may be seen in FIG. 2. Recess 112 shown in FIG. 2 is configured to engage with and secure a washer-engaging tab 131 portion of the locking tab 130. The cavities 111 also have a window that allows a part of the locking tab 130 to extend beyond the edge of the perimeter of the nut 110, which may allow a locking tab 130 to flex and provide resistance to backing off. The cavities 111 are also configured to extend above the top of the top of the washer 120 in the embodiment shown in FIG. 1. Such a configuration may allow a wrench or other tool to engage with the nut 110 and prevent locking tabs 130 from flexing and resisting the loosening of the nut, as is discussed in more detail below. Other shapes and configurations are possible and within the scope of the present invention.

In the embodiment shown in FIG. 1, washer 120 comprises an outer wall 121, a locking feature 122, a lip 123, and a protrusion 124. In the embodiment shown in FIG. 1, washer 120 comprises a substantially annular shape and defines a substantially cylindrical opening through the center of the washer 120. The opening defined by washer 120 has substantially the same diameter as the opening defined by the nut 1 10. However, in some other embodiments, the washer may define other sized or shaped openings. For example, in one embodiment, washer 120 may define an opening having a square cross-section or a D-shaped cross-section. In another embodiment, washer 120 may define an opening having any suitable cross-section, such as a cross-section complementary to a cross-section of a spindle.

The washer 120 also comprises locking feature 122. In the embodiment shown in FIG. 1, the outer circumference of locking feature 122 comprises an alternating series of peaks and valleys (referred to as "ridges") configured to engage with locking tab 130. In the embodiment shown, the ridges comprise a 'U' and inverted-'U' shape. In one embodiment, the ridges may comprise a saw tooth or 'V' and inverted-'V' shape. Other suitable shapes for the ridges may be employed in other embodiments of the present invention.

Figure 3:
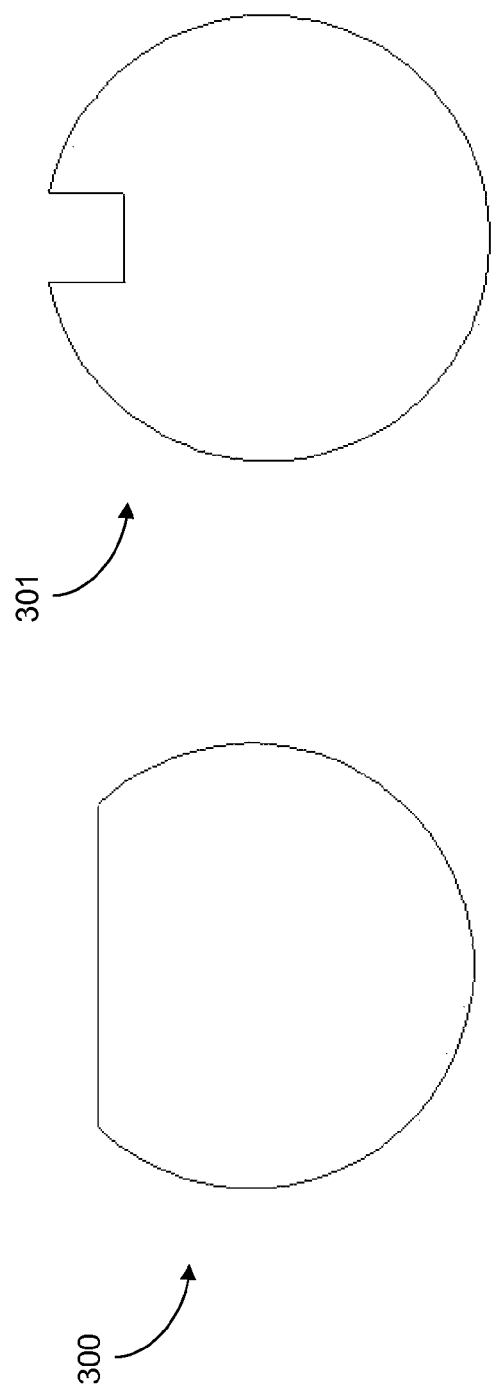
FIG. 3 shows cross-sectional views of spindles according to one embodiment of the present invention.

In the embodiment shown in FIG. 1, the washer 120 also comprises a protrusion 124 configured to engage with a complementary feature on an axle, spindle, or other fitting with which the self-locking nut 100 may engage. For example, FIG. 3 shows cross-sections of illustrative fittings to which a self-locking nut according to one or more embodiments of the present invention may engage. Fitting 300 comprises a substantially D-shaped cross section. Fitting 301 comprises a substantially circular cross-section with a notch for receiving a corresponding feature on a self-locking nut according to one or more embodiments of the present invention, such as, for example, protrusion 124 shown in FIG. 1.

The washer 120 in the embodiment shown in FIG. 1 also comprises a lip 123 configured to slidably engage with a portion of a locking tab 130. The lip 123 is defined by a volume formed in the interior perimeter of the washer running around the circumference (or inner perimeter of a non-circular shape). The lip is configured to allow a portion of a locking tab to fit within the volume and slidably engage with the upper surface of the volume, or the lip 123. The locking tab 130 and the mating of the locking tab 130 with the washer 120 will be described in more detail below.

The self-locking nut 100 shown in FIG. 1 comprises a plurality of locking tabs 130. A locking tab 130 according to the embodiment shown in FIG. 1 is shown in greater detail in FIG. 2, and comprises a nut-engaging feature 131, a washer-engaging tab 132, a notch 133, and a locking end 134. In the embodiment shown in FIGS. 1 and 2, locking tab 130 is configured to insert into cavity 111. In the embodiment shown in FIG. 1, the nut-engaging feature 131 is configured to fit within the recess 112 in the cavity 111, and to couple to the nut 110 with an interference fit. Locking tab 130 is further configured to extend below the lower face of the nut 110 to engage with the locking feature 122 and the lip 123 of the washer 120. For example, in the embodiment of the present invention shown in FIG. 1, the lower face of the nut 110 may sit against the upper surface of the locking feature 122, which provides a gap between the lower surface of the nut 110 and the washer's lower surface 120. In other embodiments of the present invention, the lower face of the nut may have a portion cut away to allow the nut 110 to fit over the locking feature 122. In one such an embodiment, the locking tabs 130 may not extend below the lower face of the nut 110, but may instead engage with the locking feature 110 through an opening formed in the inner diameter of the nut 110.

In the embodiment shown in FIG. 1, washer-engaging tab 132 is configured to slideably engage with lip 123 to secure the nut 110 to the washer 120, such that as nut 110 rotates with respect to washer 120, washer-engaging tab 132 will slide along the underside of lip 123. If locking tab 130 is engaged with cavity 112 by nut-engaging feature 131, and engaged to lip 123 by washer-engaging tab 132, then the nut 110, the washer 120, and the locking tab 130 form a unitary self-locking nut 100 structure suitable for use with conventional sockets. Further, the nut 110 will be free to rotate with respect to the washer 120 because of the slidable coupling provided by the locking tabs 130 and the lip 123.

Nut 110 also comprises a notch 133 configured to engage with the locking feature 122 of the washer. In the embodiment of the present invention shown in FIG. 1, and shown in more detail in FIG. 2, notch 133 has a shape generally complementary to the rides formed by the locking feature 122. When engaged with the locking feature 122 and the nut rotates, the locking tab 130 may flex as notch 133 moves over a peak of one of the ridges, which may cause the locking end 134 of the locking tab 130 to contact the washer 120.

Figure 4:
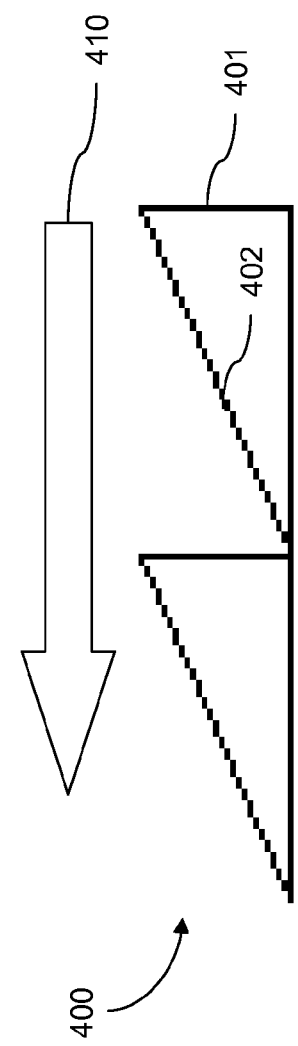
FIG. 4 shows a saw-toothed pattern according to one embodiment of the present invention.

The locking end 134 of the locking tab 130 is configured to contact with the washer 120 and provide resistance to rotation of the nut. In the embodiment shown, contact between the locking end 134 and the washer 120 may result in more resistance in one direction of rotation than for rotation in the opposite direction. Other embodiments of the present invention may comprise additional features to increase the resistance between the locking end 134 and the washer 120. For example, in one embodiment of the present invention, the washer may additionally comprise sawtooth features formed on the inner surface of the washer. An illustrative sawtooth pattern 400 may be seen in FIG. 4. In such an embodiment, the locking end 134 of the locking tab 130 is configured to contact the flat edge 401 of the sawtooth pattern 400 when rotating in a loosening direction 410, providing resistance to undesired loosening of the nut 110. However, when rotating in the opposite direction, the locking end 134 of the locking tab 130, may slide along the sloped edge 402 of the sawtooth pattern 400, which may provide less resistance.

Figure 5A:
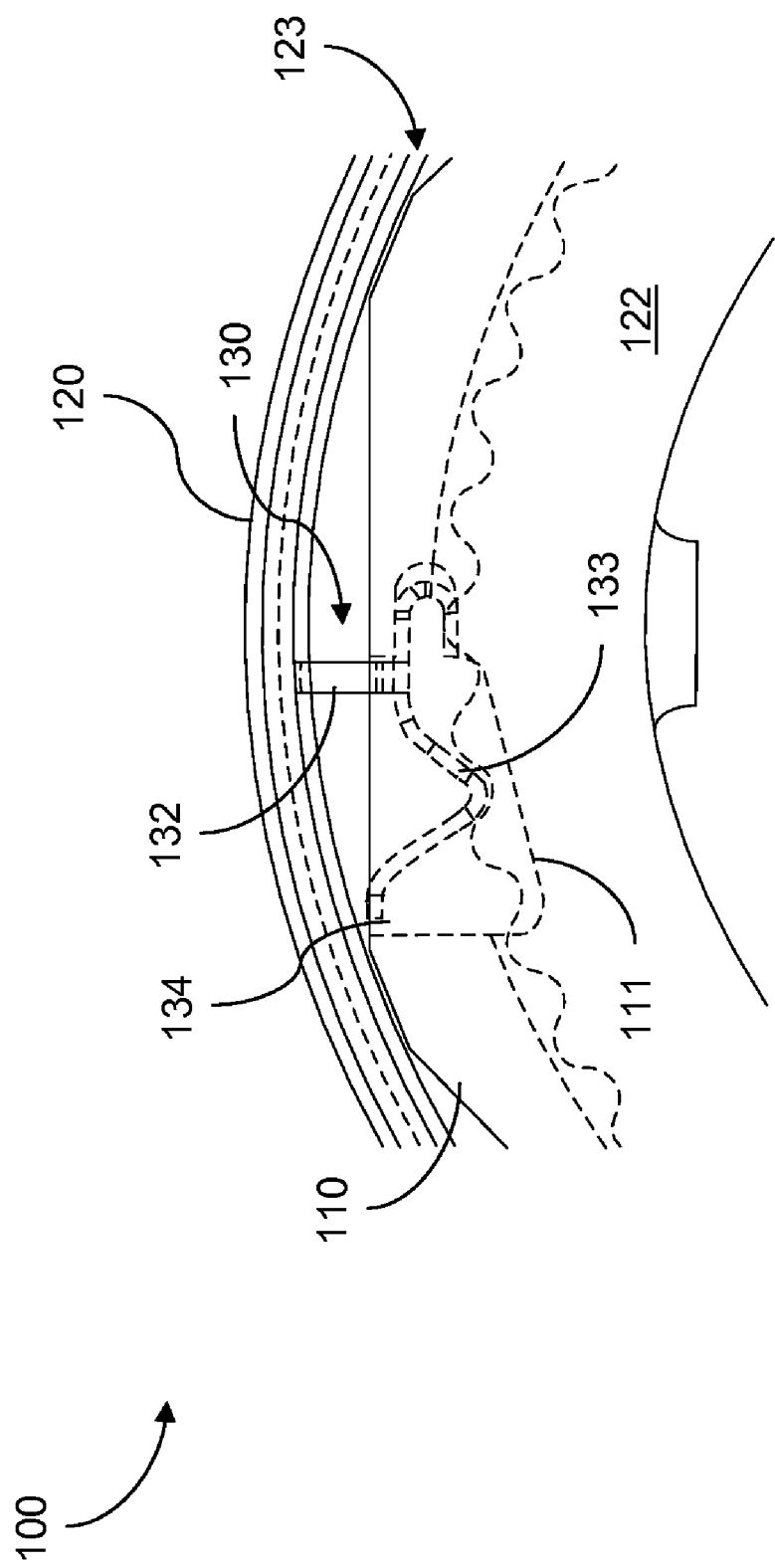
FIGS. 5A and 5B show a cross-section of a portion of an assembled self-locking nut according to one embodiment of the present invention.
Figure 5B:
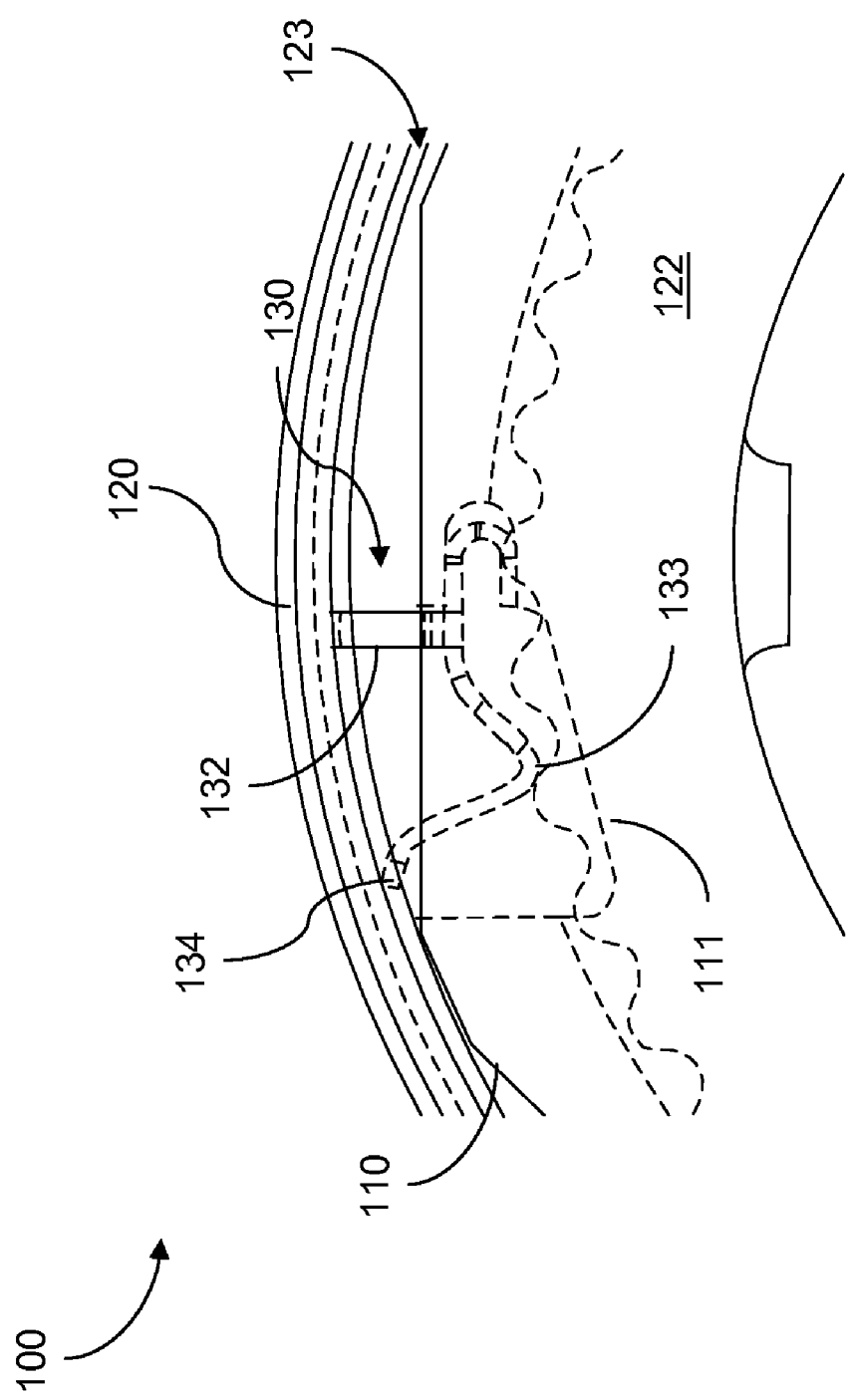

FIGS. 5A and 5B show a cross-section of a portion of an assembled self-locking nut according to one embodiment of the present invention. The cavity 111 in the nut 110 shown in FIGS. 5A and 5B is engaged with locking tab 130. The nut-engaging portion 131 is held in place within the recess 112 in the cavity 111 by an interference fit. The washer-engaging tab 132 has slidably engaged with the lip 123 of the washer 120. The nut is thereby slidably coupled to the washer. The notch 133 of the locking tab 130 is engaged with the locking feature 122 of the washer 120. In FIG. 5A, the notch 133 is contacting a valley between two ridges of the locking feature 122. As can be seen, in such a situation the locking tab 130 is not flexed, and locking end 134 is not in contact with the inner perimeter of the washer 120. However, in FIG. 5B, the nut 110 has rotated with respect to the washer 120, and the notch 133 of the locking tab 130 has moved along a ridge on the locking feature 122. The locking tab 130 has flexed to allow the movement of the notch 133 along the ridge, while the nut-engaging feature remains engaged by the recess 112 in the cavity 111. Because the locking tab 130 has flexed, the locking end 134 has moved into contact with the inner perimeter of the washer 120, and may provide resistance to further rotation of the nut 110 with respect to the washer 120.

Figure 6:
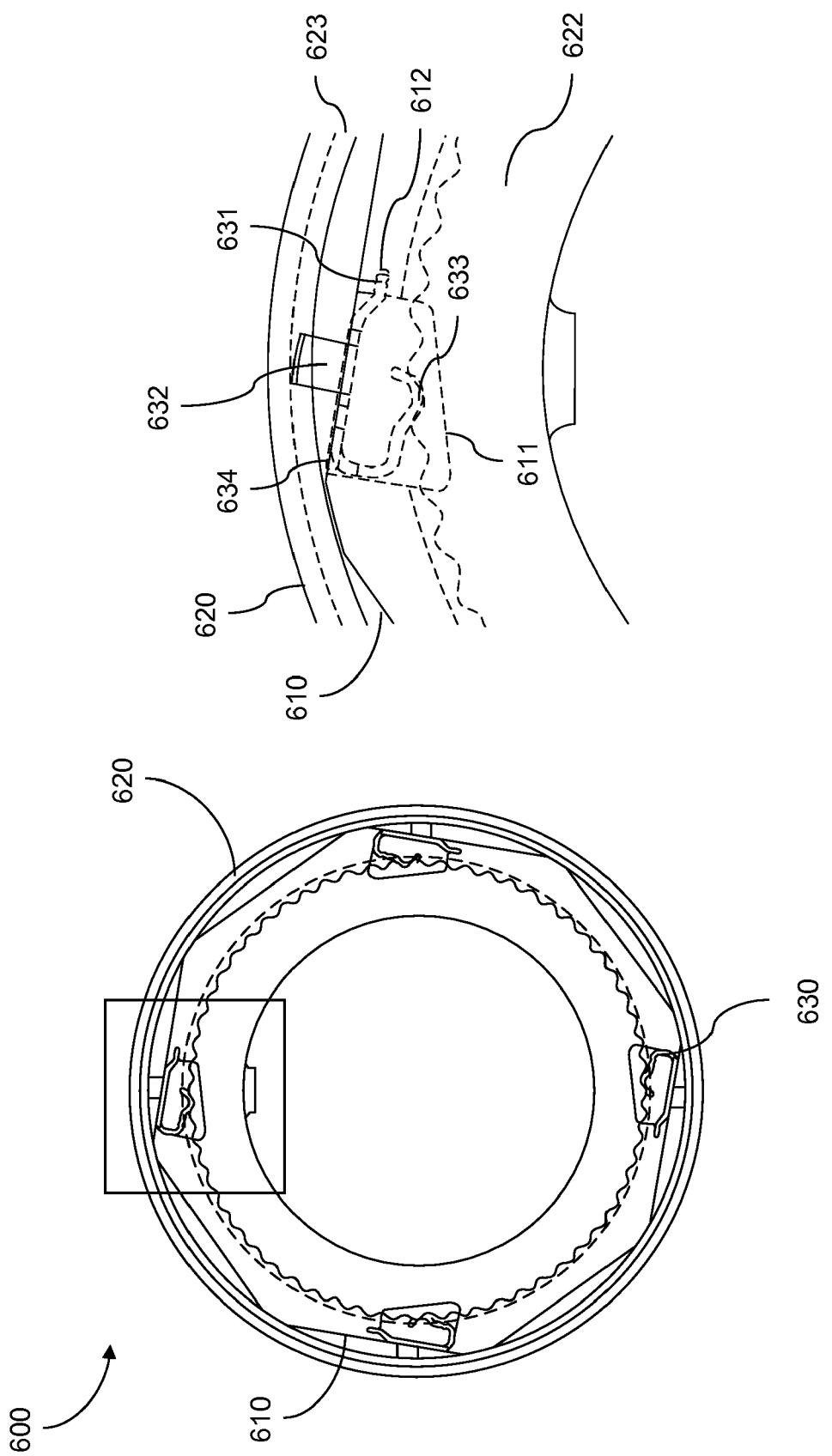
FIG. 6 shows a self-locking nut according to one embodiment of the present invention.

FIG. 6 shows a self-locking nut 600 according to one embodiment of the present invention. The self-locking nut 600 shown in FIG. 6 has substantially the same components as the embodiment shown in FIG. 1, namely a nut 610, a washer 620, and a plurality of locking tabs 630; however, the configuration of the locking tabs 630 is different, as are the shapes of the cavities 611 and recesses 612 in the nut 610. A more detailed view of the locking tab 630 may be seen in FIG. 7. The locking tab 630 shown in FIG. 7 comprises a nut-engaging feature 631, a washer-engaging tab 632, a notch 633, and locking end 634. Similar to the embodiment shown in FIGS. 1-5, locking tab 630 slidably couples nut 610 to washer 620. Locking tab 630 couples to nut 610 by an interference fit between the nut-engaging feature 631 and the recess 612 in the cavity 617. The washer-engaging tab 632 of the locking tab 630 also slidably engages with the lip 623 of the washer 620. Thus, the nut 610 may be slidably coupled to the washer 620 by the locking tab 630.

Figure 7:
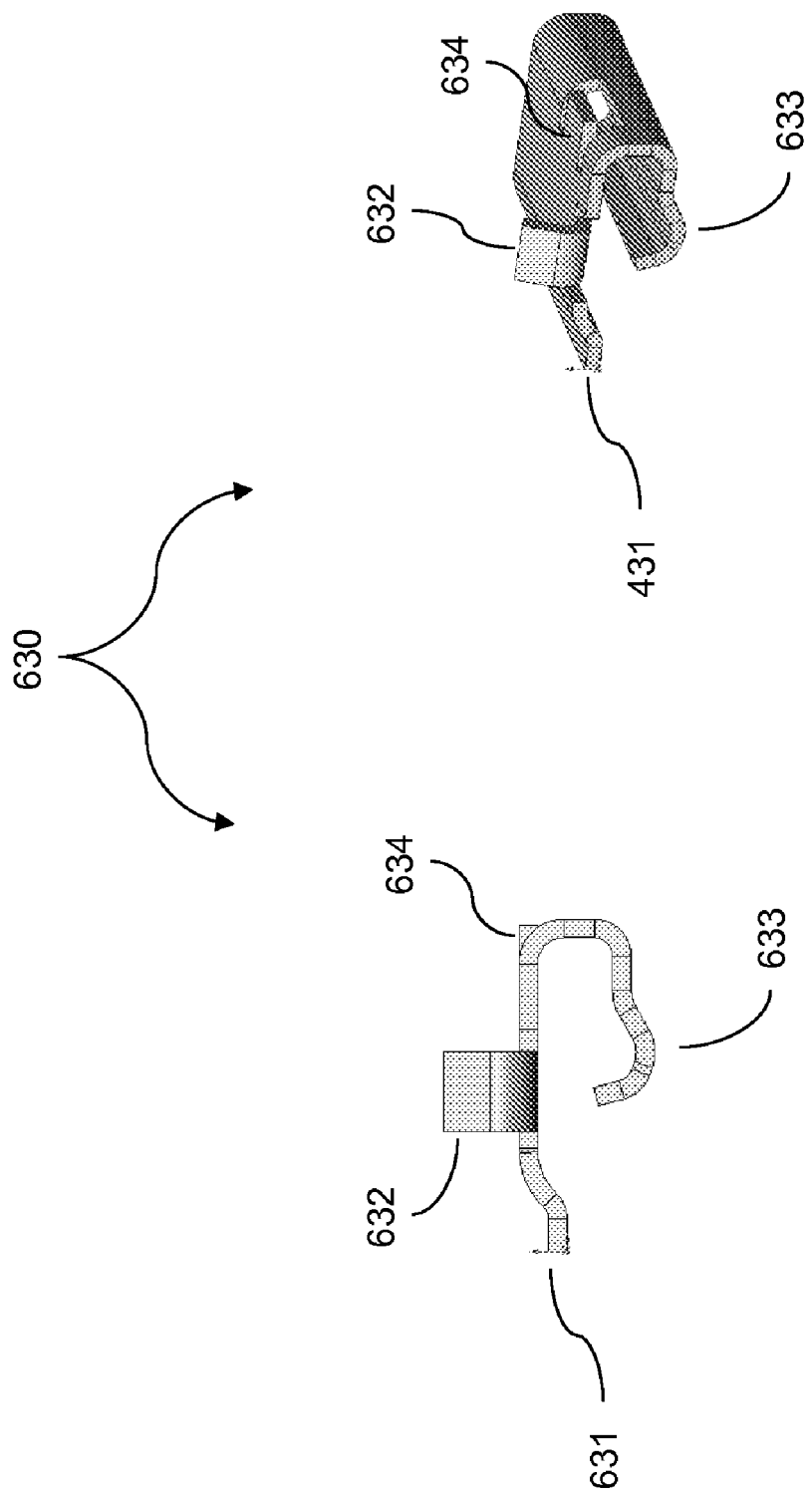
FIG. 7 shows a locking tab according to one embodiment of the present invention.
Figure 8:
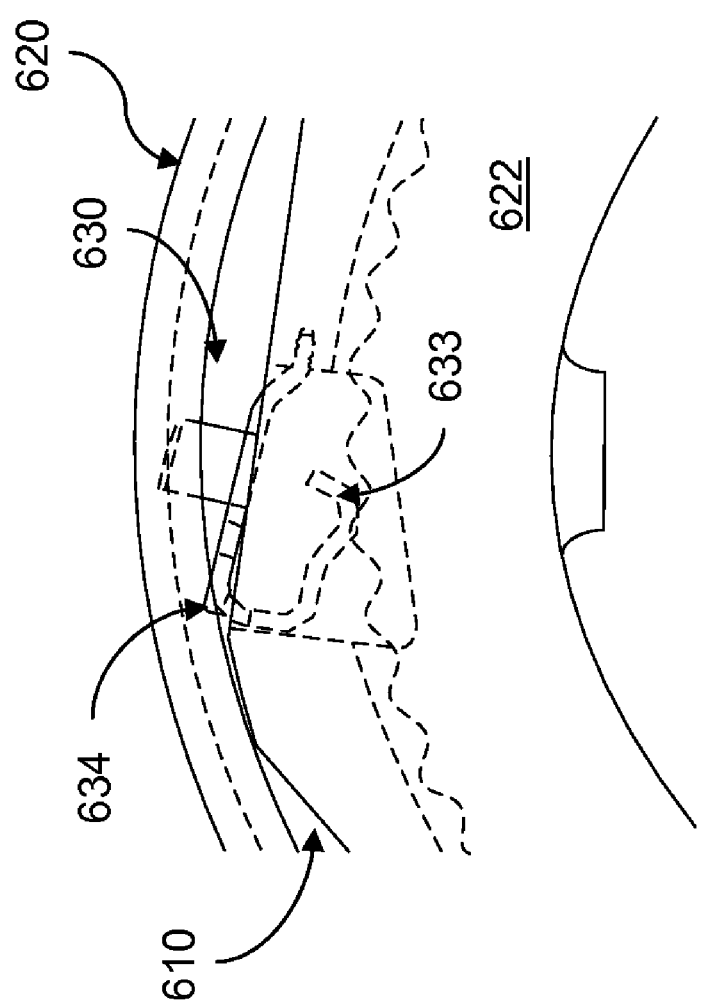
FIG. 8 shows a cross-section of a portion of an assembled self-locking nut according to one embodiment of the present invention.

The locking tab 630 according to the embodiment shown in FIGS. 6 and 7 also comprises a notch 633. The notch 633 is configured to engage with the locking feature 622 on the washer 620. As the nut 610 rotates, notch 633 moves along the profile of the locking feature 622 of the washer 620, causing the locking tab 630 to flex. When the tab flexes, the locking end 634 contacts the inner perimeter of the washer 620, providing a resistance to rotation. FIG. 8 shows the locking tab 630 shown in FIGS. 6 and 7 flexing from moving along a ridge on locking feature 622, causing locking end 634 to contact the inner perimeter of the washer 622, thereby resisting rotation of the nut 610 relative to the washer 620.

Figure 9:
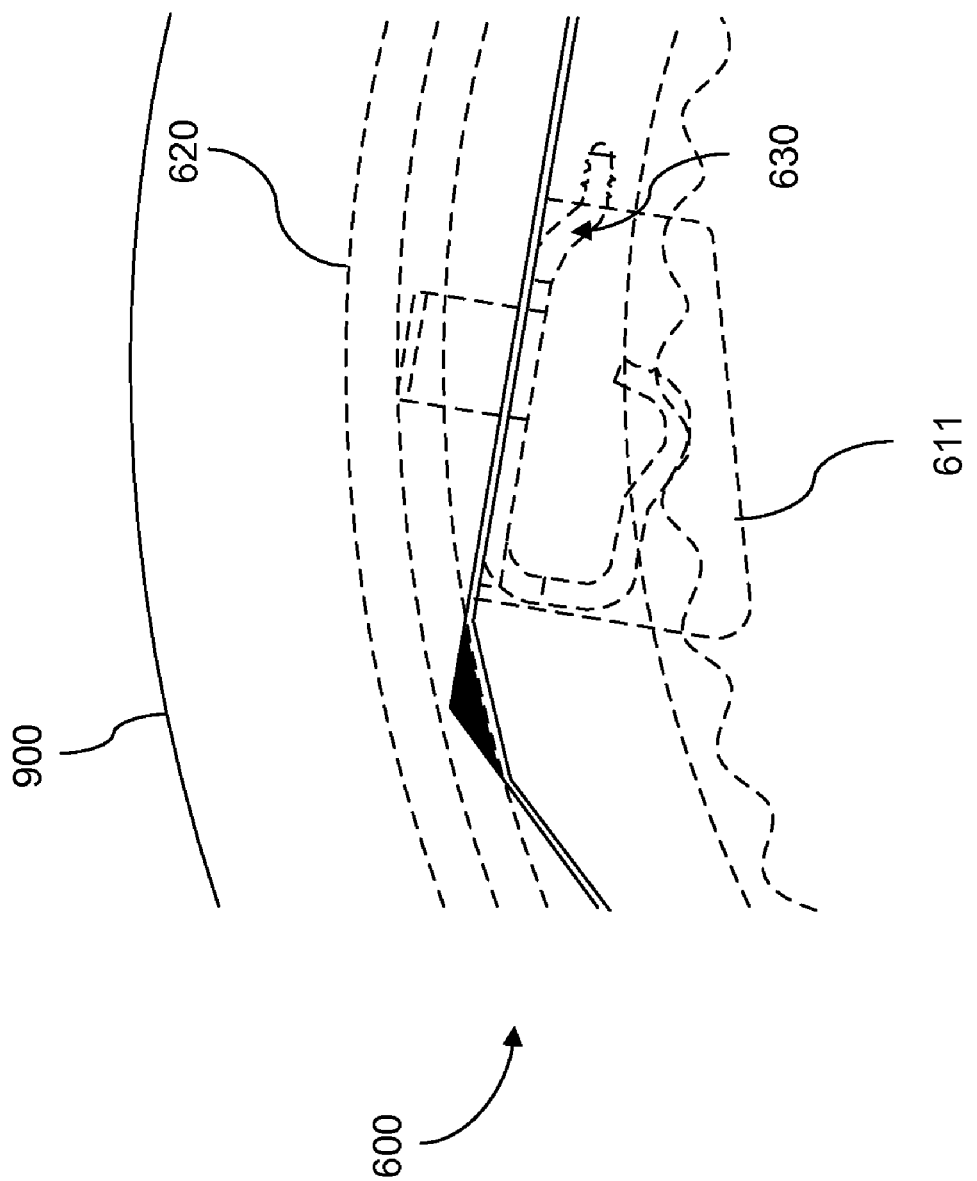
FIG. 9 shows a self-locking nut according to one embodiment of the present invention engaged by a tool.

FIG. 9 shows a self-locking nut 600 according to one embodiment of the present invention engaged by a tool 900. The tool 900 has engaged self-locking nut 600 and has partially covered cavity 611, which has received locking tab 630. The tool 900 has a shape substantially corresponding to the shape of nut 610, such that tool 900 mates closely with the outer edges of nut 610. Such a mating prevents locking tab 630 from deflecting out of cavity 611, which would cause the locking end 634 of the locking tab 630 to engage with the inner perimeter of the washer 620. Further, the tool 900 may be engaged when the locking tabs 630 are not extending beyond the edges of cavity 611, or extending only slightly, and therefore providing very little, if any, resistance to the engagement of the tool 900. This allows the tool 900 to be engaged with little or no force needed to overcome the locking components of the self-locking nut 600.

Thus, by engaging nut 610 with a tool 900 of suitable shape, locking tab 630 may be held in place, and nut 610 may be tightened or loosened. Further, because the shape of the tool 900 is sufficient to prevent the locking tabs 630 from resisting rotation of the nut 610 relative to the washer 620, the user need not apply additional forces to hold tool 900 in place, or to prevent the self-locking nut 600 from locking. Further, no additional force may be needed to fit the tool 900 over the nut 610 as locking tabs 630 may be entirely recessed within cavities 611 when engaged with a valley of locking feature 622. Thus, a self-locking nut according to embodiments of the present invention may be applied and removed using standard tools, but may add the advantage of resisting backing off of a spindle during operation.

Figure 10B:
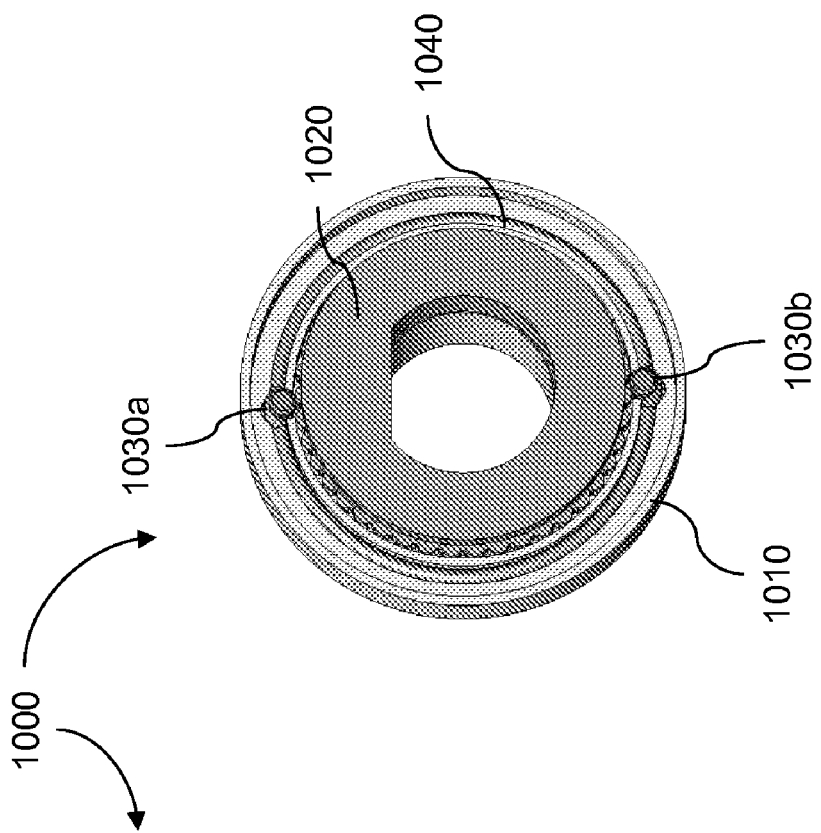
FIGS. 10A-C show a self-locking nut according to one embodiment of the present invention.
Figure 10A:
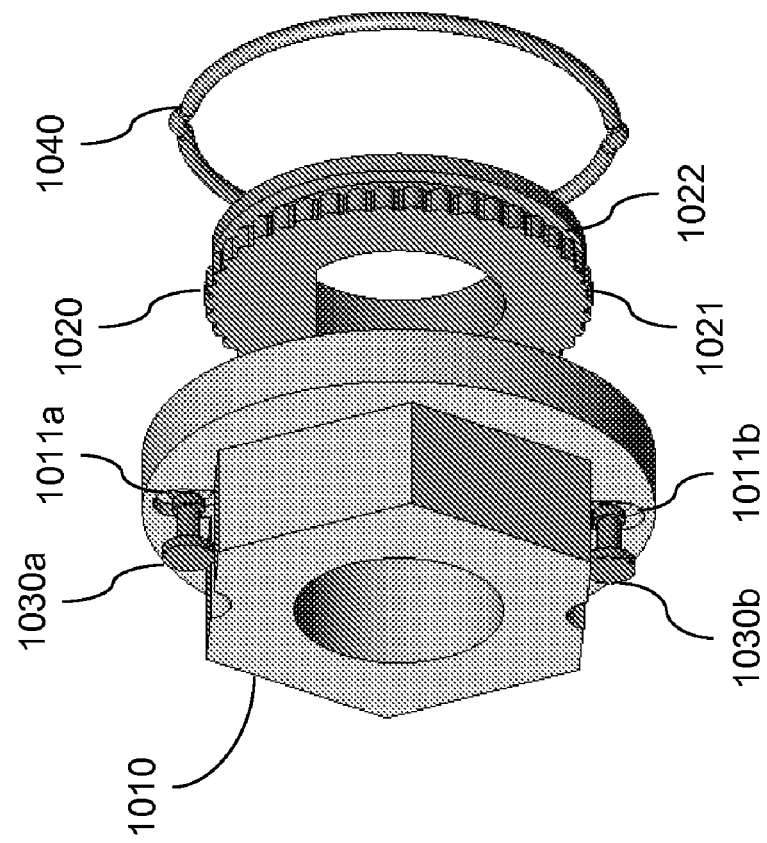

Referring now to FIGS. 10A and 10B, a self-locking nut 1000 according to one embodiment of the present invention comprises a nut 1010, a washer 1020, two pins 1030a,b, and a wire spring 1040. The nut 1010 comprises two features 1011a,b for accepting the pins 1030a,b, and a central bore having a substantially circular cross-section through which a spindle, or similar fixture, may be engaged. While the embodiment shown in FIGS. 10A and 10B show a nut 1010 comprising two features 1011a,b for accepting pins, a different number of pins and/or pin features may be included. For example, in an embodiment, one pin feature may be provided, or three or more pin features may be provided. Further, features may be substantially evenly spaced in one embodiment. In another embodiment, features may be unevenly spaced. In one embodiment, features may be configured to receive implements other than pins. For example, in one embodiment, features may be configured to receive a portion of a spring, such as spring 1040 shown in FIGS. 10A,B. In the embodiment shown, the nut is constructed of steel. In other embodiments, the nut may be constructed of other materials, such as powder metal or plastic.

Figure 10C:
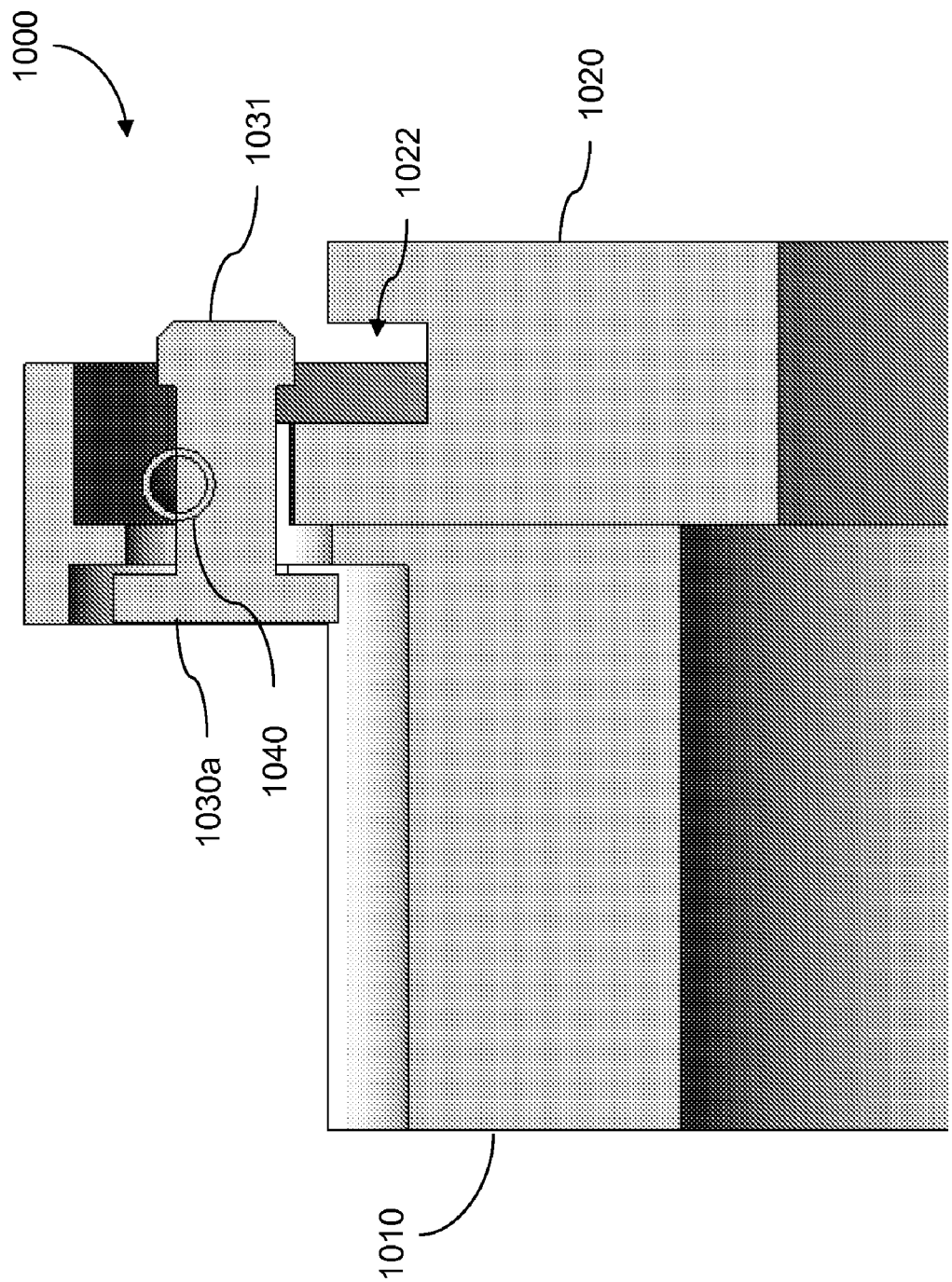

In the embodiment shown in FIGS. 10A-C, two pins 1030a,b are inserted into the nut features and engaged with the washer 1020 and spring 1040. The pins 1030a,b may be configured to fit within the feature and extend beyond the bottom face of the nut 1010. In the embodiment shown in FIGS. 10A and 10B, the pins are constructed of steel. In other embodiments, the pins may be constructed of other materials, such as wear-resistant composite polymers.

In the embodiment shown in FIGS. 10A-C, the washer 1020 comprises a generally annular shape with a central bore having a substantially circular cross-section with a flattened portion. The washer 1020 further comprises an outer diameter having a locking feature 1021 comprising a plurality of ridges, and a groove 1022 configured to receive the end 1031 of the pins 1030a,b. The washer bore may have a substantially circular shape with a flattened side for engaging with a spindle with a corresponding flattened cross-section. If the nut 1010 has a circular bore, the nut 1010 may be able to turn freely about the spindle, while the washer 1020 is held in place as the flattened portion of the washer bore engages with the flattened portion of the spindle. Other configurations for the bore are within the scope of the present invention, so long as the bore is configured to engage with a spindle with a sufficiently complementary cross-section to substantially prevent the washer from rotating with respect to the spindle.

In one embodiment of the present invention, the locking feature 1021 of the washer 1020 may comprise ridges wherein the cross-sectional shape of the ridges is symmetrical. For example, in one embodiment of the present invention, the ridges comprise a triangular or "V" shape. In another embodiment, the ridges comprise a circular arc shape or "U" shape. In one embodiment, ridges may have a saw-toothed shape, such as may be seen in FIG. 4.

In one embodiment of the present invention, the locking feature 1021 may comprise a shape wherein the torque required to tighten the nut 1010 may be less than the torque required to loosen the nut 1010. For example, the embodiment shown in FIG. 11 comprises ridges having a shape wherein the entry portion 1100 of each ridge comprises a shape that may provide less resistance to rotation of the nut than the trailing portion 1110 of the ridge.

While the embodiment shown in FIGS. 10A-C show a washer 1020 comprising a locking feature 1021, in one embodiment of the present invention, the locking feature 1021 may be formed on the back face of the nut 1010, rather than on the washer 1020. The locking feature 1021 formed on the nut 1010 may incorporate any of the characteristics described with respect to embodiments wherein the washer comprises the locking features. In such an embodiment, the washer 1020 may comprise one or more pins 1030a,b to engage with the locking feature 1021 on the nut 1010 to resist rotation of the nut 1010 relative to the washer 1020.

In the embodiment shown in FIGS. 10A-C, the washer is constructed of steel. In other embodiments, the washer may be constructed of other materials, including wear-resistant and high-load-capable composite polymers.

One potential advantage of the embodiment shown in FIGS. 10A and 10B may be realized by the use of the locking features of the washer. The locking features may provide for fine adjustment over the tightening of the nut. For example, a nut may be rotated a small amount, for example equal to the distance between two adjacent valleys, to provide an increase or decrease in the tightness of the nut on the spindle.

The washer shown in FIGS. 10A and 10B comprises a groove 1022 to accept the lower end 1031 of pin 1030a as shown in FIG. 10C. The spring 1040 may be configured to engage with the pins 1030a,b to hold the pins against the locking feature 1021 of the washer 1020, as well as to ensure that the lower end 1031 of the pins 1030a,b remains engaged with the groove 1022 to slidably couple the washer 1020 to the nut 1010. The spring 1040 holds the pins 1030a,b against the locking features of the washer such that the pins 1030a,b are held in place by tension. By so engaging the nut 1010, the pins 1030a,b, the washer 1020, and the spring 1040, a single assembly 1000 may be constructed.

In the embodiment shown in FIGS. 10A-C, the spring is constructed of steel. In other embodiments, the spring may be constructed of other materials, including elastomers.

The assembled self-locking nut 1000 may be fitted over a spindle, axle, or other structure such that the washer bore is configured to engage with the spindle. The shape of the washer bore may be any suitable shape such that the washer will be substantially prevented from rotating when engaged with a spindle with a sufficiently complementary cross-section. For example, a washer bore with a square cross-section may engage with a spindle with a circular cross-section with a flattened portion. The flattened portion may engage with one edge of the square washer bore and substantially prevent the washer from rotating relative to the spindle. Still other configurations would be apparent to one of ordinary skill in the art.

Once the assembled self-locking nut 1000 is fitted over the spindle, the nut 1010 may be rotated relative to the spindle and the washer 1020. As the nut 1010 is rotated the pins may be forced to travel past the locking features on the washer, putting the spring into tension as the pins travel over the ridges of the locking features, and into less tension as the pins engage the valleys between the ridges. If the nut 1010 is tightened against the object to be secured, the tension in the spring as well as the frictional force exerted against the nut 1010 by the washer 1020 may provide sufficient resistance to rotation of the nut 1010 to prevent the nut 1010 from backing off of the secured object. However, if the nut 1000 is fitted over the spindle and not securely tightened, the spring, the pins 1030 and locking feature 1040 will help prevent the nut from unintentionally backing off or loosening. Further, the spring tension can be adjusted to increase the torque necessary for the nut 1010 to rotate relative to the washer 1020.

Figure 12:
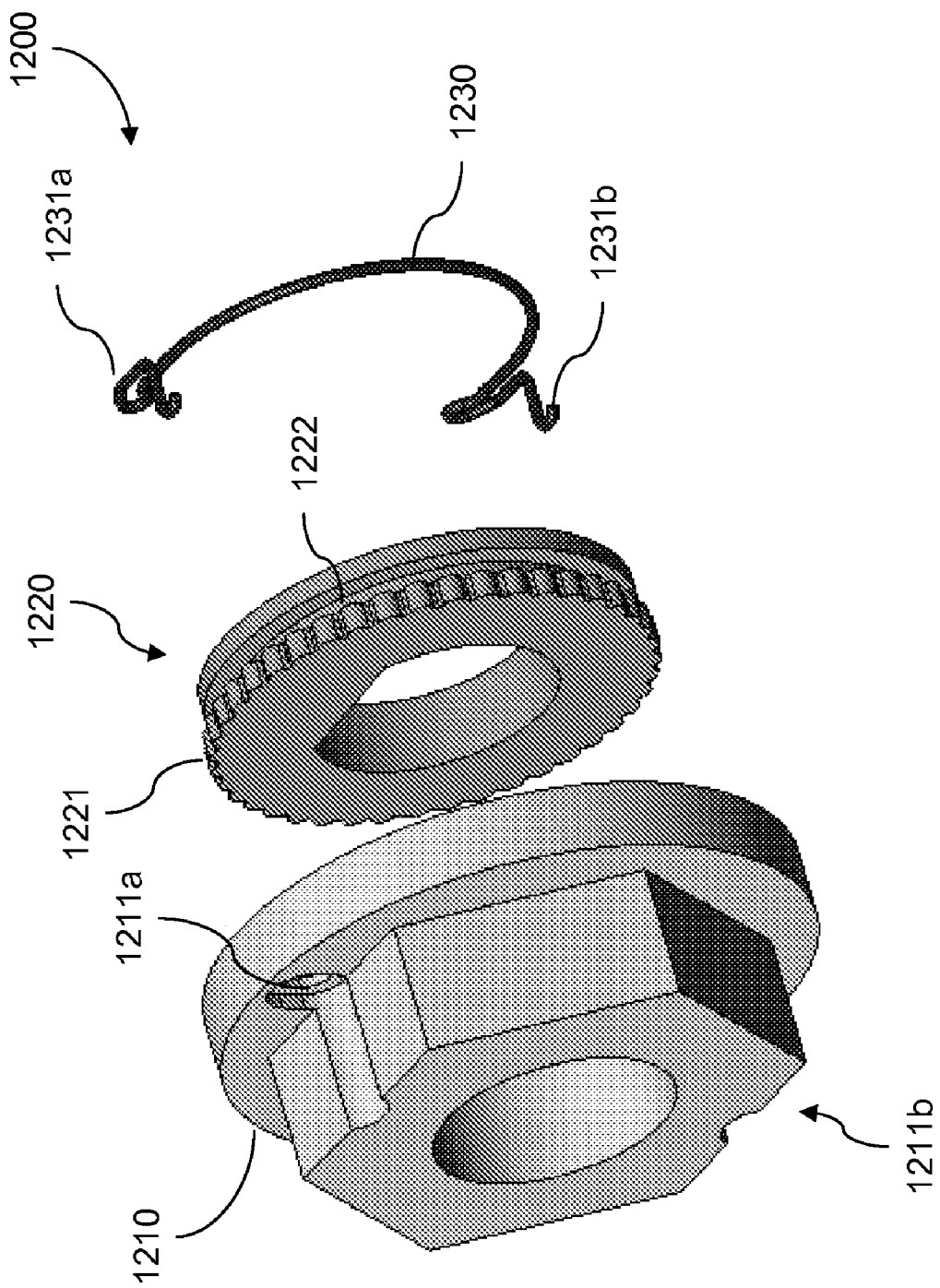
FIG. 12 shows an exploded view of a self-locking nut according to one embodiment of the present invention.

FIG. 12 shows a self-locking nut 1200 according to one embodiment of the present invention. The self-locking nut 1200 comprises a nut 1210, a washer 1220, and a wire lock spring 1230. The nut 1210 comprises a plurality of nut features 1211a,b configured to engage with the wire lock spring 1230. The washer 1220 comprises a generally annular shape with a substantially circular bore with a flattened portion, and a groove 1222 formed into the outer diameter of the washer 1220. A locking feature 1221 is also formed in the outer diameter of the washer 1220. The wire lock spring 1230 is configured to engage with and rest within the groove 1222 in the outer diameter of the washer 1220. The wire lock spring 1230 also comprises two bent ends 1231a,b. The bent ends 1231a,b are configured to engage with the nut features 1211a,b to slidably couple the nut 1210 to the washer 1220. The bent ends 1231a,b also engage with the locking feature 1221 of the washer 1220. The bent ends 1231a,b are held substantially in place by the nut features 1211a,b, and are also held in tension against the locking feature 1221, such that if the nut 1210 rotates relative to the washer 1220, the bent ends 1231a,b must deflect as they pass over the ridges of the locking feature 1221. This deflection provides resistance to the rotation of the nut 1210 relative to the washer 1220.

Figure 13:
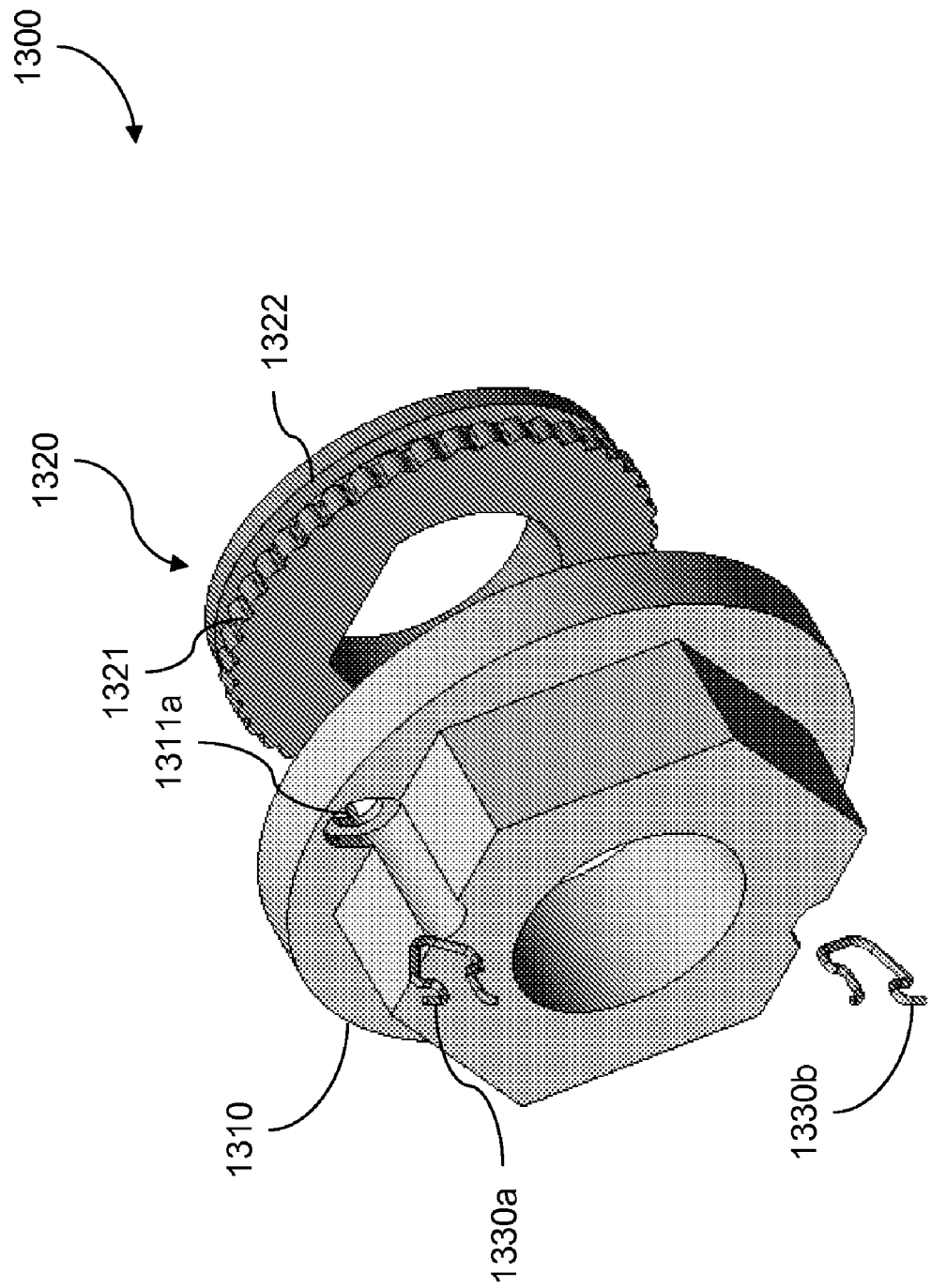
FIG. 13 shows an exploded view of a self-locking nut according to one embodiment of the present invention.

FIG. 13 shows a self-locking nut 1300 according to one embodiment of the present invention. The self-locking nut 1300 shown in FIG. 13 comprises a nut 1310 having a plurality of nut features 1311a,b, a washer 1320, and a plurality of lock inserts 1330a,b. Lock inserts 1330a,b are configured to be inserted into the nut features 1311a,b and to engage the washer 1320.

Figure 14:
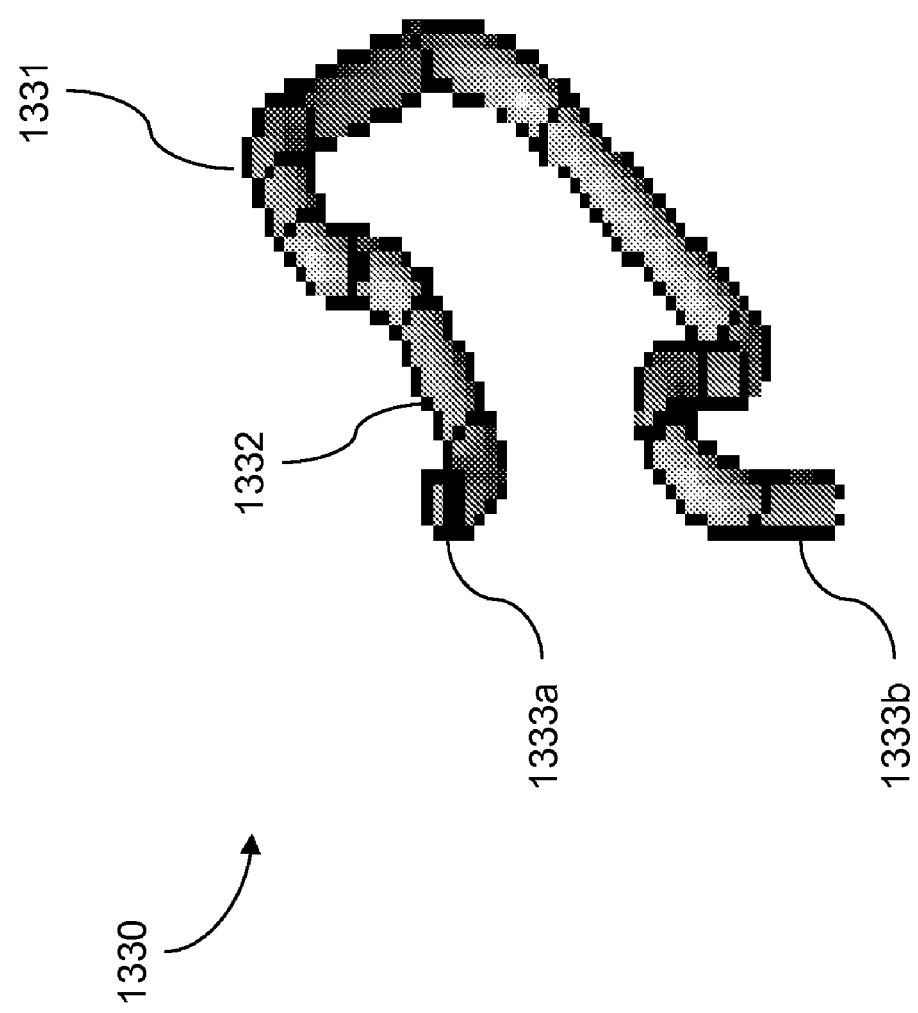
FIG. 14 shows a lock insert according to one embodiment of the present invention.

FIG. 14 shows a more detailed view of a lock insert 1330 according to the embodiment shown in FIG. 13. The lock insert 1330 comprises two ends 1333a,b configured to engage with the nut feature 1311 to hold the lock feature in place within the nut feature 1311. The lock insert 1330 also comprises a feature 1332 to engage with the locking feature 1321 on the washer 1320, and a groove-engaging feature 1331 configured to fit within the groove 1322 in the washer 1320 to slidably engage the washer 1320 to the nut 1310. The lock insert 1330 is configured to be inserted through a nut feature 1331a,b and engage with the groove 1322 and locking feature 1321 of the washer 1320. If the nut 1310 is rotated relative to the washer 1320, the lock inserts 1330a,b may be configured to deflect in response to ridges of the locking features 1321 on the washer 1320. This deflection may provide resistance against rotation of the nut 1310 relative to the washer 1320. While the embodiment shown in FIG. 13 shows a nut 1310 comprising two nut features 1311a,b and two lock inserts 1330a,b, some other embodiments of the present invention may comprise a different number of nut features 1311a,b and lock inserts 1330a,b may be used. Further, a nut feature 1311 may be configured to receive a plurality of lock inserts 1330. Multiple lock inserts 1330 within a single nut feature 1311 may provide additional force for securing the washer 1320 to the lower face of the nut 1310, and may further provide additional resistance to the rotation of the nut 1310 relative to the washer 1320.

Figure 15:
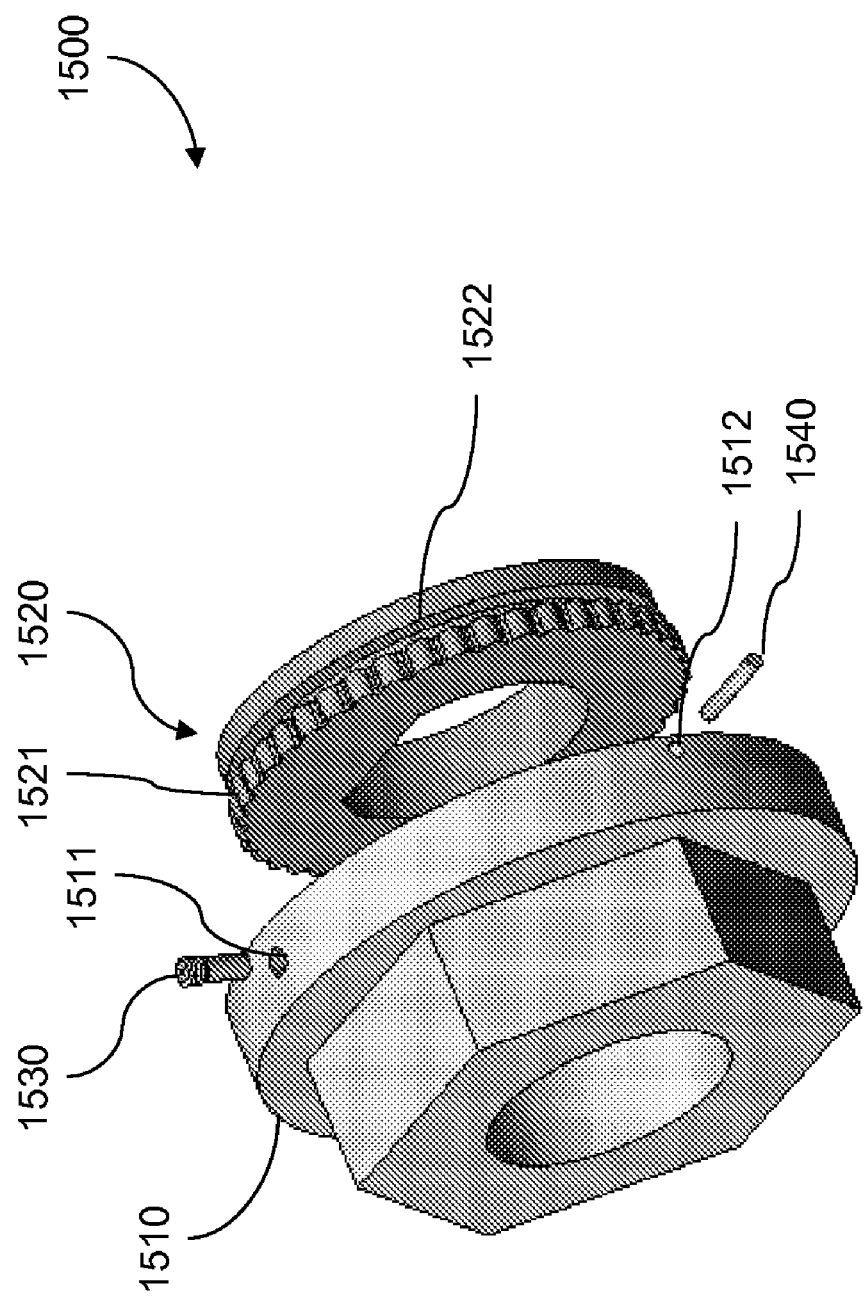
FIG. 15 shows an exploded view of a self-locking nut according to one embodiment of the present invention.

FIG. 15 shows an exploded view of a self-locking nut 1500 according to one embodiment of the present invention. The embodiment shown in FIG. 5 comprises a nut 1510, a washer 1520, a ball spring screw lock 1530, and a pin 1540. The washer 1520 comprises a locking feature 1521, and a groove 1522. The ball spring lock 1530 is configured to be inserted into cavity 1511 and couple with an interference fit. The ball spring lock 1530 has a spring-loaded pin, and is configured to engage with the locking feature 1521 to resist rotation of the nut 1510 relative to the washer 1520. Pin 1540 is configured to be inserted into cavity 1512 and be secured with an interference fit. The pin is configured to engage with the groove 1522 on the washer to slidably couple the washer 1520 to the nut 15 10. While the embodiment shown in FIG. 15 only shows a single pin 1540 and ball spring lock 1530, some other embodiments may comprises more than one pin 1540 and/or more than one ball spring lock 1530.

A self-locking nut 1500 according to the embodiment shown in FIG. 15 may be assembled by engaging the nut with the washer, inserting the ball spring screw lock into a first cavity 1511 in the nut as shown, wherein the ball spring screw lock is configured to engage with the locking features of the washer; and inserting the pin into a second hole 1512, the pin 1540 configured to engage with the groove 1522 on the washer 1520 to secure the washer 1520 to the nut 15 10. In such an embodiment, the nut 1510 is configured to be rotatable relative to the washer. As the nut 1510 rotates with respect to the washer, the ball spring pin lock 1530 may be forced into compression by the locking feature 1521 on the washer, providing resistance to rotation of the nut 1510 relative to the washer 1520.

Figure 16B:
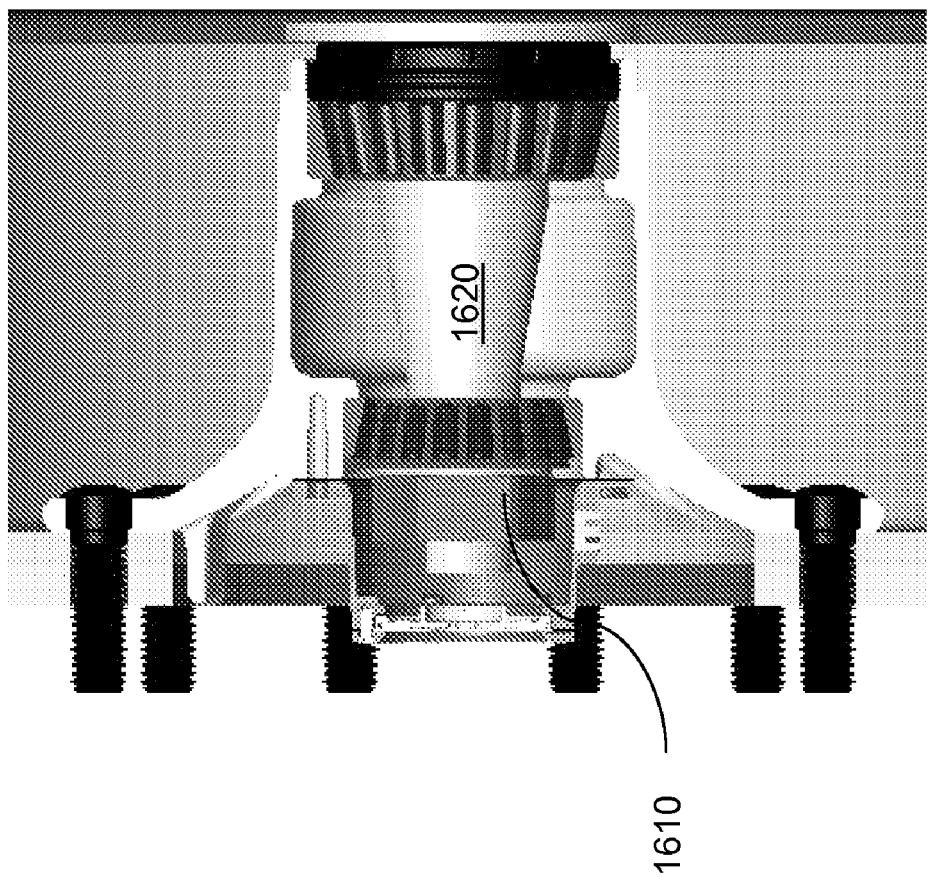
FIGS. 16A-B shows a self-locking nut according to one embodiment of the present invention installed on an axle.
Figure 16A:
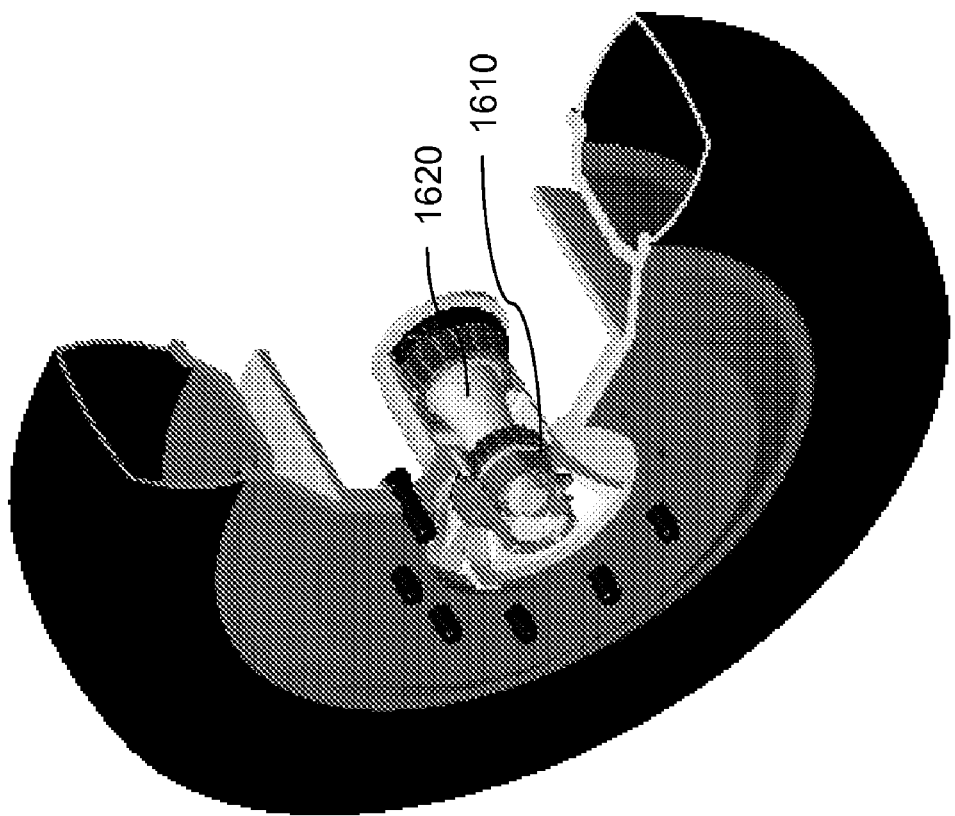

FIGS. 16A-B shows a self-locking nut 1600 according to one embodiment of the present invention installed on an axle 1620. The self-locking nut 1600 shown in FIGS. 16A-B has been installed on an axle 1620 to hold a wheel-end in place. The end of the axle 1620 comprises a threaded portion which the nut 1610 screws onto and against the wheel-end to hold the wheel-end in place.

Self-locking nut 1600 may be installed on the threaded end of the axle 1620 and tightened by using a tool, such as a socket, which may prevent locking tabs on the nut from resisting the rotation of the nut 1610. The nut 1610 may be tightened, and then backed-off slightly, such as by sliding the locking tabs or pins back past one or more ridges of the washer's locking feature, and allowing a person to carefully select the amount of torque needed to remove the nut 1610 from the axle 1620. Once the tool has been removed, the locking features of the nut and washer may interact to prevent the nut 1610 from backing off unintentionally.

General

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A self-locking nut, comprising:
   a nut comprising (i) a substantially cylindrical opening through the center thereof with threads that are adapted to engage with corresponding threads of a spindle, and (ii) at least one cavity;
   a washer comprising (i) a substantially cylindrical opening through the center of the washer, and (ii) a locking feature located between an outer circumference of the washer and the cylindrical opening, the locking feature comprising a plurality of ridges located on an outer circumference of the locking feature; and
   at least one locking tab located at least partially within said cavity and coupled to said nut with an interference fit, said locking tab slidably coupling the nut to the washer and engaging with the ridges on the outer circumference of the locking feature to resist rotation of the nut with respect to the washer.

2. The self-locking nut of claim 1, wherein the washer comprises at least one cavity for receiving the at least one locking tab.

3. The self-locking nut of claim 1, wherein the at least one locking tab comprises a nut-engaging feature, a washer-engaging tab, a notch, and a locking end.

4. The self-locking nut of claim 3, wherein the nut-engaging feature is configured to engage with said cavity.

5. The self-locking nut of claim 3, wherein the washer-engaging tab is slidably engageable with the washer to couple the nut to the washer.

6. The self-locking nut of claim 1, wherein the locking tab is disengageable from the locking feature by engagement of a tool with the self-locking nut.

7. A self-locking nut, comprising:
   a nut having at least one cavity;
   a washer comprising (i) a substantially cylindrical opening through the center of the washer, and (ii) a locking feature located between an outer circumference of the washer and the cylindrical opening, the locking feature comprising a plurality of ridges located on an outer circumference of the locking feature; and
   at least one locking tab located at least partially within said cavity and coupled to said nut with an interference fit, said locking tab slidably coupling the nut to the washer and engaging with the ridges on the outer circumference of the locking feature to resist rotation of the nut with respect to the washer,
   wherein the at least one locking tab comprises a nut-engaging feature, a washer-engaging tab, a notch, and a locking end, and
   wherein the notch is engageable with the ridges of the locking feature.

\* \* \* \* \*